United States Patent [19]

Danforth et al.

[11] 4,309,300
[45] Jan. 5, 1982

[54] CLEANING SOLVENT AND METHOD OF CLEANING A METAL SURFACE

[75] Inventors: Mervin A. Danforth, Anaheim; Julian Giles, Huntington Park; Saburo Nakahara, Garden Grove, all of Calif.

[73] Assignee: McDonnell Douglas Corporation, Long Beach, Calif.

[21] Appl. No.: 36,059

[22] Filed: May 4, 1979

[51] Int. Cl.$^3$ .......................... C09D 9/00; C11D 7/22
[52] U.S. Cl. ...................................... 252/170; 134/38; 252/364; 252/DIG. 8; 252/162; 427/327
[58] Field of Search ................. 252/162, DIG. 8, 364, 252/170; 134/38, DIG. 8; 106/311; 427/327, 444

[56] References Cited

U.S. PATENT DOCUMENTS

| | | | |
|---|---|---|---|
| 1,996,125 | 4/1935 | Shillenn | 252/364 |
| 2,228,108 | 1/1941 | Bjorksten | 106/311 |
| 2,262,488 | 11/1941 | Bjorksten | 106/311 |
| 2,294,479 | 9/1942 | Peter | 427/335 |
| 2,471,501 | 5/1949 | Steigleman | 252/364 |
| 2,705,207 | 3/1955 | Stevens | 134/38 |
| 2,929,789 | 3/1960 | Pickett et al. | 252/DIG. 8 |
| 3,429,823 | 2/1969 | Cataneo | 252/364 |
| 3,463,735 | 8/1969 | Stonebraker et al. | 252/162 |
| 3,551,204 | 12/1970 | Bolger et al. | 134/38 |
| 3,625,763 | 12/1971 | Melillo | 134/38 |
| 3,737,386 | 6/1973 | Geiss | 252/DIG. 8 |
| 3,746,649 | 7/1973 | Barrett | 252/170 |
| 3,796,602 | 3/1974 | Briney et al. | 134/38 |
| 4,078,102 | 3/1978 | Beadz et al. | 134/38 |

Primary Examiner—Ronald H. Smith
Assistant Examiner—S. L. Childs
Attorney, Agent, or Firm—Max Geldin

[57] ABSTRACT

The surfaces of organic polymeric coatings applied to detail parts or components are subject to contamination and ultraviolet degradation prior to final overcoating procedures. The sources of ultraviolet exposure are light transmission through windows, artificial lighting, or temporary exterior exposure of the detail part coated surface. The ultraviolet light altered surface layer is effectively removed by treatment with a mixture of a glycol ether, an alcohol, a ketone and deionized water, without removing the main body of the coating. This results in good adhesion of a subsequently applied touch-up coating or overcoating. The process can also be used for cleaning metals.

10 Claims, No Drawings

CLEANING SOLVENT AND METHOD OF CLEANING A METAL SURFACE

BACKGROUND OF THE INVENTION

This invention relates to the cleaning of contaminated surfaces, and is particularly concerned with the removal of polymeric surface coatings which have been altered or changed by ultraviolet light exposure, without removing the basic coating. The invention also is directed to removal of contaminants from metal surfaces.

In the aircraft industry, component or detail parts coated with an organic polymeric coating, such as polyurethane, e.g. integral fuel tank coatings of this type, are subjected to ultraviolet light rays from windows, artificial lighting or temporary exterior exposure for extended periods prior to assembly, resulting in a change in the composition of the surface of the coating. During assembly, scratches, gouges and chipping occur, frequently causing damage down to the base metal surface. These surfaces are solvent cleaned with conventional solvents such as 1,1,1-trichlorethane or methyl ethyl ketone, prior to being touched up with fresh coating. However, during service, gross adhesion failures of the touchup coating have occurred in many aircraft. The resultant effect is reduced corrosion resistance of the damaged area and possible contamination of the fuel filter by the loose coating.

U.S. Pat. No. 3,796,602 discloses stripping or removal of polymer resist masks by treatment at elevated temperatures employing a blend of glycol ether, surfactant and an alkaline agent.

U.S. Pat. No. 4,078,102 discloses stripping of organic polymer resist layers by treating with a mixture of an aldehyde or a ketone, an alcohol and an alkali metal hydroxide or carbonate.

U.S. Pat. No. 2,294,479 discloses obtaining a high gloss on coatings by exposing the coatings with a vapor bath from a heated solvent mixture of ketones, alcohol and acetates.

U.S. Pat. Nos. 2,228,108 and 2,262,488 disclose a solvent blend for duplicating ink comprising an alcohol and a glycol ether.

However, applicants have found that commercially available solvents and solvents of the types disclosed in the above patents are ineffective for removal of ultraviolet changed polymeric surface coatings, particularly the polyurethane and epoxy type polymer coatings, employed on aircraft component parts, such as integral fuel tank coatings, and which have been oxidized by ultraviolet light, and for proper adhesion of an overcoating to the treated surface.

An object of the present invention accordingly, is to provide procedure and solvent compositions which are effective for removing polymeric surface coatings which have been altered by previous exposure to ultraviolet light rays.

Another object is to provide a process and solvent compositions for removal of ultraviolet light changed polymeric surface coatings without degrading or removing the base coating.

Still another object is the provision of procedure and solvent compositions for removing ultraviolet light changed polymer coatings, particularly polyurethane and epoxy coatings, while enhancing the adhesion of a touch-up coating or overcoating subsequently applied to the base coating.

Other objects and advantages of the invention will appear hereinafter.

SUMMARY OF THE INVENTION

The above objects and advantages are achieved according to the invention, by the provision of a process for removing the surface portion of a polymeric coating which has been altered by previous exposure to ultraviolet light, which comprises contacting the ultraviolet altered coated surface portion with a solution consisting essentially of a mixture of a glycol ether, an alcohol, a ketone and deionized water. Subsequent overcoating of such treated surface results in effective adhesion.

The glycol ether, alcohol and ketone components are preferably of the types described in greater detail hereinafter.

Further, the components of the solvent composition or mixture óf the invention are preferably employed in certain ranges of proportions, as described in greater detail below.

By practice of the invention process, and employing the solvent formulation noted above, ultraviolet altered polymeric surface layers can be readily removed, essentially at ambient temperature, without degrading or removing the base coating itself. Treatment with the solvent formulation noted above solvates and enhances the removal of the ultraviolet changed surface polymeric coating, resulting in good adhesion of a subsequently applied, e.g. touch-up, polymeric coating over the base coating. Insofar as applicants are aware, currently employed solvents do not accomplish these results, and do not approach the effectiveness of the invention process and formulation in these respects.

DETAILED DESCRIPTION OF THE INVENTION AND PREFERRED EMBODIMENTS

Various organic polymeric coatings and primers previously subjected to and altered by ultraviolet light can be treated according to the invention for reactivation of the ultraviolet changed coating. By the term "reactivation" or "reactivating" is meant rendering the remaining polymeric coating, following treatment with the solvent blend of the invention, receptive to application of an overcoating to the base coating. As previously noted, the solvent formulation employed in the invention process does not degrade or remove the underlying base coating which was shielded from the ultraviolet light exposure.

In preferred practice the polymer coatings treated according to the invention are of the type applied to aircraft components, particularly as integral fuel tank coatings applied to the inner or outer surface of fuel tank surfaces. A preferred type of organic coating for this purpose is polyurethane. Such polymers are produced by reaction of polyisocyanates, particularly diisocyanates such as 2,4-toluenediisocyanate, with glycols or polyols such as polypropylene glycol. Polyether or polyester type polyurethanes can be employed. A representative type of commercial polyurethane coating composition is marketed as DMS 1850 by De Soto, Inc.

Another class of polymeric coatings which can be treated according to the invention are epoxy coatings. Representative epoxy resins include the diglycidyl ether of bisphenol A, the diglycidyl ether of resorcinol, the triglycidyl ether of glycerol, and epoxy novolacs. Preferred epoxies comprise the glycidyl ethers of the phenols, and particularly those prepared by reacting a dihydric phenol with epichlorhydrin, e.g. the diglycidyl ether of bisphenol A.

The solvent formulation employed in the invention process consists of a glycol ether, an alcohol, a ketone and deionized water, particularly employed in the ranges of proportions noted below.

Glycol ethers which can be employed in the invention solvent are the monoalkyl ethers of ethylene glycol, diethylene glycol and dipropylene glycol, the monoalkyl groups containing 1 to 6 carbon atoms. Examples of such glycol ethers are the cellosolves, including ethylene glycol monomethyl ether (methyl cellosolve), ethylene glycol monobutyl ether (butyl cellosolve), and ethylene glycol mono-n-hexyl ether, diethylene glycol monomethyl ether, diethylene glycol monobutyl ether, dipropylene glycol monomethyl ether and dipropylene glycol monobutyl ether. Dipropylene glycol monomethyl ether is particularly preferred since it is highly effective in the solvent formulation of the invention, it has a high flash point, and health hazard data show it to be of low toxicity with very minimal absorption through the skin.

The alcohols employed in the solvent formulation of the invention are aliphatic alcohols containing from 1 to 6 carbon atams, preferably 2 to 4 carbon atoms. Such alcohols can be straight chain or branched chain aliphatic alcohols, for example, methyl, ethyl, n-propyl, isopropyl, n-butyl, isobutyl, pentyl, and hexyl alcohols. A particularly preferred alcohol is n-butyl alcohol.

The ketone component of the solvent formulation of the invention is preferably a ketone with a high flash point. Preferred ketones according to the invention are aliphatic ketones of from 3 to 8 carbon atoms and cyclo-aliphatic ketones of from 5 to 6 carbon atoms. Examples of such ketones are acetone, diethyl ketone, methyl ethyl ketone, methyl isopropyl ketone, methyl isobutyl ketone, cyclopentanone and cyclohexanone. A particularly preferred ketone is methyl isobutyl ketone.

All of the components of the solvent formulation according to the invention are miscible with each other and with water.

The components of the solvent formulation of the invention are preferably employed in the ranges of concentration, by volume, set forth in the table below.

TABLE I

| Components | Concentration Range (Volume Percent or parts by volume) |
|---|---|
| Glycol ether | 15-50 |
| Alcohol | 5-15 |
| Ketone | 3-11 |
| Deionized water | 24-77 |

Examples of preferred solvent formulations containing varying proportions of the respective components are set forth in Table II below.

TABLE II

| | Concentration (Vol %) | | | | |
|---|---|---|---|---|---|
| | A | B | C | D | E |
| Dipropylene glycol monomethyl ether. (Dowanol DPM or UCAR solvent 2LM) | 33 | 20 | 25 | 40 | 47 |
| n-butyl alcohol | 10 | 6 | 9 | 12 | 13 |
| Methyl isobutyl ketone | 7 | 4 | 6 | 8 | 10 |
| Deionized water | 50 | 70 | 60 | 40 | 30 |
| | 100 | 100 | 100 | 100 | 100 |

Composition or formulation A of Table II above is an optimum solvent blend. The flash point of such optimum solvent blend is 88° F.

The solvent blends of the invention can be formulated as a concentrate containing only the organic components, that is, glycol ether, alcohol and ketone. The deionized water can then be added within the volume range of proportions noted in Table I above. Thus, for example, the optimum formulation A can be prepared in the form of a concentrate, containing a total of 50 parts by volume, and consisting of 33 parts of the glycol ether, 10 parts of the alcohol and 7 parts of the ketone, by volume. 50 parts by volume of the deionized water is then added to make up the total formulation A, containing 1 part deionized water to 1 part of the total organic components concentrate, by volume. When diluted with the deionized water, the solvent formulations of the invention noted above, and as exemplified in Table II, are ready for use. Deionized water, rather than tap water, should be used in the invention solvent, because the range of impurities in tap water varies widely from one locale to another. Residues from impurities left on the surface can reduce the effectiveness of the solvent cleaner, and can also leave a water soluble residue which can adversely affect subsequent coating adhesion.

The solvent formulations of the invention are used for cleaning and reactivating the surfaces of polymeric coatings which have become altered or changed due to ultraviolet exposure, by wiping or rubbing such surface with a cloth wetted with the solvent formulation. Cleaning and removal of the surface coating oxidized by ultraviolet light is completed when no further color appears on the cloth. The treated surface is then wiped dry. Thereafter, a touch-up coat or an overcoat of the same polymer as the original coating, or of a different compatible polymer is applied over the base coating remaining following treatment for removal of the ultraviolet changed polymer surface portions. Tests on integral fuel tank coated assemblies treated according to the invention and on which a polymer overcoat was applied, demonstrated excellent intercoat adhesion between the base coat following treatment with the solvent formulation of the invention, and the subsequent overcoat.

The invention process employing the solvent formulation hereof also can be utilized for cleaning metal surfaces for removal particularly of organic contaminants. The metals which can be so treated according to the invention include, for example, aluminum, titanium, steel, cadmium plated steel.

The following are examples of practice of the invention.

EXAMPLE 1

Aircraft integral fuel tank panels were coated with DMS 1850 polyurethane fuel tank coating composition and were subjected to ultraviolet exposure from a carbon arc lamp for an exposure period of 50 hours, sufficient to oxidize and change the exposed surface portions of the coatings as result of such exposure to and oxidation by the ultraviolet light.

One set of the resulting coated panels subjected to ultraviolet exposure were cleaned by wiping the ultraviolet changed coated surfaces with a cloth wetted with 1,1,1-trichloroethane, and a second set of the coated and ultraviolet light exposed panels were similarly cleaned by wiping with a cloth wetted with methyl ethyl ketone. A third set of such coated and ultraviolet light exposed panels were similarly cleaned with a cloth wetted with composition A.

In all cases, that is with all three sets of panels noted above, the cloths used for wiping the coated surfaces were wetted equally, and the amount of wiping of the respective coated surface with such cloths was substantially the same for all coated panels.

It was noted that in the case of the first and second sets of coated panels treated or cleaned with the conventional solvents 1,1,1-trichlorethane and methyl ethyl ketone, the ultraviolet light exposed surface films were not removed, whereas in the case of the third set of coated panels cleaned with the invention solvent mixture A, the ultraviolet exposed and changed surface portions of the coating were removed, without damaging or removing any portions of the underlying base coatings.

Following treatment with the solvents as noted above, all three sets of coated panels were touched-up or overcoated with a coating of the same DMS 1850 polyurethane coating composition as the base coating, and were cured and dried. All of the resulting overcoated panels were then subjected to an adhesion test to determine the degree of adhesion of the overcoating. This adhesion test was carried out by immersing all of the coated panels in water for 24 hours at room temperature, removing the panels and wiping them dry. The coating on each of the coated panels was then scribed with a stylus to scribe an "X" through each coating. A one inch wide adhesion testing masking tape, #250 of the 3M Co., was placed down over the scribed "X". The degree of adhesion of the overcoat to the base coat was determined by rapidly removing the masking tape from each coated panel. If the tape pulled away with the overcoating, this showed poor adhesion and failure of the bond between the base coat and the overcoat. If the overcoat could not be pulled or stripped away, this showed good adhesion of the touch-up or overcoat to the base coating.

It was observed that in the case of the first and second coated panels, treated with the conventional 1,1,1-trichlorethane or methyl ethyl ketone solvents, prior to overcoating, the overcoat could be stripped from the coated surfaces by the above test, indicating poor and unsatisfactory adhesion of the overcoating to the base coating, whereas in the case of the third set of coated panels treated with the invention solvent formulation A prior to overcoating, the overcoat adhered well to the base coating of the previously coated surfaces.

EXAMPLE 2

The procedure of Example 1 was carried out but wherein the coated third set of panels, following exposure to ultraviolet light, were respectively treated with the invention formulations B, C, D and E.

Results similar to Example 1 were obtained, that is, removal of the ultraviolet altered surface coating layers, by application of compositions B, C, D and E, without degrading or removing the base coating, and following overcoating of such panels, the tests showed good adhesion of such overcoating to the base coating, as contrasted to the results for the first and second sets of panels of poor adhesion of the overcoat to the base coating of such coated panels.

From the foregoing, it is seen that the invention provides novel procedure for removing ultraviolet altered surface layers of coated surfaces, particularly metal aircraft surfaces coated with organic polymers such as polyurethane, without degrading the underlying base coating, and wherein the touch-up coating or overcoat applied thereto has good adhesion to the base coating, by application of a novel solvent mixture of glycol ether, alcohol, ketone and deionized water to the ultraviolet changed surface portions of the coating, prior to application of the touch-up or overcoating. The result is that during service, adhesion failures of the touch-up coating or overcoating to the base coating do not occur, particularly in the case of integral fuel tank coatings, thus avoiding contamination of fuel filters by the loose coatings, and reduced corrosion resistance of the resulting uncoated damaged areas. Additional advantages include efficient cleaning of the ultraviolet changed coated surfaces, low toxicity and low flammability of the novel solvent mixture of the invention, and the ability of the composition to be provided in concentrate form. In addition, the solvent mixture of the invention and the process utilizing same are applicable for cleaning metals as well as coated parts.

While we have described particular embodiments of the invention for purposes of illustration, it will be understood that various changes and modifications can be made therein within the spirit of the invention, and the invention accordingly is not to be taken as limited except by the scope of the appended claims.

What is claimed is:

1. A process for cleaning a metal surface for removal particularly of organic contaminants which comprises contacting said metal surface with a solution consisting essentially of a mixture of a glycol ether, an alcohol, a ketone and deionized water, employing 15–50% of said glycol ether, 5–15% of said alcohol, 3–11% of said ketone and 24–77% deionized water, by volume, said glycol ether being a monoalkyl ether of a glycol selected from the group consisting of ethylene glycol, diethylene glycol and dipropylene glycol, said monoalkyl group containing 1 to 6 carbon atoms, said alcohol being an aliphatic alcohol containing from 1 to 6 carbon atoms, said ketone being selected from the group consisting of an aliphatic ketone of from 3 to 8 carbon atoms and cycloaliphatic ketones of 5 to 6 carbon atoms.

2. The process as defined in claim 1, wherein said metal is selected from the group consisting of aluminum, titanium, steel and cadmium plated steel.

3. The process as defined in claim 2, said solution consisting essentially of 15–50% dipropylene glycol monomethyl ether, 5–15% n-butyl alcohol, 3–11% methyl isobutyl ketone, and 24–77% deionized water, by volume.

4. A composition for removing an ultraviolet light altered polymeric coating or for cleaning a metal surface for removal particularly of organic contaminants, which consists essentially of 15–50% of a glycol ether, 5–15% of an alcohol, 3–11% of a ketone and 24–77% deionized water, by volume, said glycol ether being a monoalkyl ether of a glycol selected from the group consisting of ethylene glycol, diethylene glycol and dipropylene glycol, said monoalkyl group containing 1 to 6 carbon atoms, said alcohol being an aliphatic alcohol containing from 1 to 6 carbon atoms, said ketone being selected from the group consisting of an aliphatic ketone of from 3 to 8 carbon atoms and cycloaliphatic ketones of 5 to 6 carbon atoms.

5. The composition as defined in claim 1, said monoalkyl group containing from 2 to 4 carbon atoms, said aliphatic alcohol containing 2 to 4 carbon atoms.

6. The composition as defined in claim 1, said solution consisting essentially of 15-50% of dipropylene glycol monomethyl ether, 5-15% n-butyl alcohol, 3-11% methyl isobutyl ketone, and 24-77% deionized water, by volume.

7. The composition as defined in claim 6, said solution consisting essentially of 33% dipropylene glycol monomethyl ether, 10% n-butyl alcohol, 7% methyl isobutyl ketone and 50% deionized water, by volume.

8. A composition which when diluted with deionized water is suitable for removing an ultraviolet light altered polymeric coating, which consists essentially of 15-50 parts of a glycol ether, 5-15 parts of an alcohol and 3-11 parts of a ketone, by volume, said glycol ether being a monoalkyl ether of a glycol selected from the group consisting of ethylene glycol, diethylene glycol and dipropylene glycol, said monoalkyl group containing 1-6 carbon atoms, said alcohol being an aliphatic alcohol containing from 1 to 6 carbon atoms, and said ketone being selected from the group consisting of an aliphatic ketone of from 3 to 8 carbon atoms and cycloaliphatic ketones of 5 to 6 carbon atoms.

9. A composition as defined in claim 8, said glycol ether being dipropylene glycol monomethyl ether, said alcohol being n-butyl alcohol and said ketone being methyl isobutyl ketone.

10. A composition as defined in claim 9, consisting essentially of 33 parts propylene glycol monomethyl ether, 10 parts n-butyl alcohol and 7 parts methyl isobutyl ketone, by volume.

* * * * *